United States Patent
Jang et al.

(10) Patent No.: US 9,813,696 B2
(45) Date of Patent: Nov. 7, 2017

(54) STEREOSCOPIC IMAGE DISPLAY DEVICE

(71) Applicant: LG Display Co., Ltd., Seoul (KR)

(72) Inventors: Jin-Hyuk Jang, Busan (KR); Hoon Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 36 days.

(21) Appl. No.: 14/980,127

(22) Filed: Dec. 28, 2015

(65) Prior Publication Data

US 2017/0064292 A1 Mar. 2, 2017

(30) Foreign Application Priority Data

Aug. 31, 2015 (KR) .................. 10-2015-0122648

(51) Int. Cl.
*H04N 13/04* (2006.01)

(52) U.S. Cl.
CPC ..... *H04N 13/0411* (2013.01); *H04N 13/0404* (2013.01)

(58) Field of Classification Search
None
See application file for complete search history.

(56) References Cited

U.S. PATENT DOCUMENTS

| | | | | |
|---|---|---|---|---|
| 8,408,775 B1* | 4/2013 | Coleman | ........... | G02F 1/133526 362/602 |
| 2001/0001566 A1* | 5/2001 | Moseley | ............ | G02B 27/2214 349/15 |
| 2006/0126174 A1* | 6/2006 | Gibilini | ................ | G03B 21/625 359/460 |
| 2009/0225244 A1* | 9/2009 | Wang | .................. | G02B 27/2214 349/15 |
| 2010/0097449 A1* | 4/2010 | Jeong | .................. | G02B 27/2214 348/59 |
| 2013/0033849 A1* | 2/2013 | Roberts | .................... | G09F 13/14 362/97.1 |
| 2013/0057159 A1* | 3/2013 | Pijlman | .............. | G02B 27/0093 315/154 |
| 2013/0314512 A1* | 11/2013 | Watanabe | .......... | H04N 13/0402 348/51 |
| 2014/0071352 A1* | 3/2014 | Huang | ............... | G02B 27/2264 349/5 |

* cited by examiner

*Primary Examiner* — Ryan Crockett
(74) *Attorney, Agent, or Firm* — Morgan, Lewis & Bockius LLP

(57) ABSTRACT

A stereoscopic image display device including a rear barrier and a parallax unit and thus having highly improved brightness is disclosed. The stereoscopic image display device includes a rear barrier disposed on a bottom surface of a display panel, a parallax unit disposed on a top surface of the display panel, and a light collecting unit disposed between the rear barrier and a backlight unit. Here, the light collecting unit collects light incident from the backlight unit in an open region of the rear barrier to improve brightness of the stereoscopic image display device.

18 Claims, 7 Drawing Sheets

STEREOSCOPIC IMAGE DISPLAY DEVICE

This application claims the benefit of the Korean Patent Application No. 10-2015-0122648, filed on Aug. 31, 2015, which is hereby incorporated by reference as if fully set forth herein.

BACKGROUND OF THE INVENTION

Field of the Invention

The present invention relates to an image display device, and more particularly, to a stereoscopic image display device.

Discussion of the Related Art

Stereoscopic image display devices may be divided into stereoscopic image display devices of a glasses mode and a glassless mode, depending on the need for glasses.

Among the stereoscopic image display devices, glassless-mode stereoscopic image display devices generally realize three-dimensional (3D) images when an optical element capable of causing parallax between left-eye and right-eye images is installed in front of a display screen. The optical element having such a function includes a lenticular lens, a parallax barrier, etc.

The parallax barrier realizes a stereoscopic image by arranging vertical slits for transmitting or shielding light at constant distances and separating right and left images through the vertical slits, and the lenticular lens realizes stereoscopic images by attaching a lens in a curved lenticular array shape to a display panel and allowing a left eye and a right eye to see different pixels to separate right and left images.

However, in related art stereoscopic image display devices, an optimal viewing distance is generally determined by pitches of unit lenses in a parallax unit or pitches of certain periods of unit slits. In this case, it is impossible to ensure an optimal viewing distance greater than or equal to a predetermined distance due to limitations on resolution which may be realized with pitches.

Therefore, an alternative plan to provide a separate gap glass in the front or rear of the parallax unit to extend an optimal viewing distance has been proposed, but has a problem in that the thickness of the stereoscopic image display device increases, which makes it possible to manufacture a slim stereoscopic image display device.

SUMMARY

Accordingly, the present invention is directed to a stereoscopic image display device that substantially obviates one or more problems due to limitations and disadvantages of the related art.

An object of the present invention is to provide a stereoscopic image display device in a rear barrier type having improved brightness by collecting light emitted from a backlight unit in an open region of a rear barrier.

Another object of the present invention is to provide a stereoscopic image display device capable of achieving slimness thereof and improving brightness while assuring an optimal viewing distance greater than or equal to a predetermined distance Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device includes a display panel, a rear barrier formed on a bottom surface of the display panel, and a parallax unit formed on a top surface of the display panel, and further includes a light collecting unit formed between the rear barrier and the backlight unit.

In this case, the light collecting unit may collect light emitted from the backlight unit in the open region of the rear barrier.

For this purpose, the light collecting unit may include a prism sheet having a low index of refraction disposed below the rear barrier, between the open regions to expose the open regions, and a transparent insulating film having a high index of refraction covering the prism sheet and rear barrier.

According to another exemplary embodiment, the light collecting unit may include a plurality of lenticular lenses covering the open regions formed below the rear barrier and having a low index of refraction.

In this case, the lenticular lenses may be disposed so that the centers of the lenticular lenses correspond to the open regions, and may further include a transparent insulating film to cover the lenticular lenses.

The patterns of the prism sheet and the lenticular lens may have various shapes, depending on the pattern of the open region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Prior to the present invention, this applicant has proposed a stereoscopic image display device having a novel structure in which a rear barrier is disposed on a bottom surface of a display panel and a parallax unit is disposed on a top surface of the display panel.

The stereoscopic image display device having such a novel structure has advantages in that it is possible to manufacture slim stereoscopic image display devices, and an optimal viewing distance greater than or equal to a predetermined distance may be ensured at uniform brightness with no 3D crosstalk.

The rear barrier of the stereoscopic image display device serves to extend an optimal viewing distance of a stereoscopic liquid crystal panel using properties such as an optimal viewing distance that is inversely proportional to an optical pitch of an image panel under the optically same gap conditions by opening partial regions of subpixels in the display panel to reduce the optical pitch of the image panel at a predetermined point of view (hereinafter referred to as "view").

As a result, the stereoscopic image display device having the novel structure blocks light from partial regions of the subpixels in the display panel, and thus has a drawback in that brightness of the stereoscopic image display device may be degraded.

The present invention relates to a structure of the stereoscopic image display device proposed to prevent brightness from being degraded, and thus is proposed to improve the brightness of the stereoscopic image display device by collecting light emitted from a backlight unit in a rear barrier.

Hereinafter, preferred embodiments of the present invention will be described in detail with reference to the accompanying drawings. To aid in understanding the present invention, like numbers refer to like elements throughout the description of the figures, and the description of the same elements will be not reiterated. In describing the present invention, detailed descriptions of known technology and or configurations related to the present invention will be omitted for clarity when the detailed descriptions are considered to obscure the gist of the present invention. In addition, the names of elements used in the detailed description are chosen in consideration of ease of drafting this application, and thus may differ from actual names of parts in products.

Figure 1:
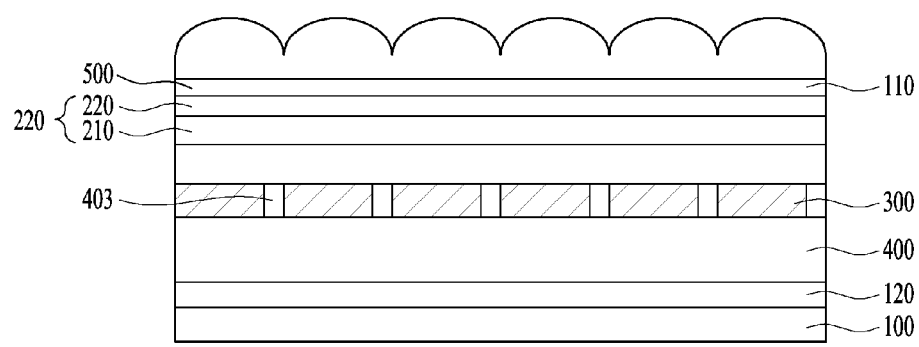
FIG. 1 is a view illustrating a stereoscopic image display device according to one exemplary embodiment of the present invention.

FIG. 1 is a view illustrating a stereoscopic image display device according to one exemplary embodiment of the present invention.

The stereoscopic image display device according to one exemplary embodiment of the present invention includes a display panel 200 for displaying an image, the display panel 200 having a plurality of subpixels in a matrix form, a parallax unit 500 disposed on the display panel 200 to separate images at a plurality of views, a rear barrier 300 disposed on a bottom surface of the display panel 200 and having an opening to open partial region of each subpixel, a backlight unit 100 disposed below the display panel 200 to radiate light to the display panel 200, and a light collecting unit 400 disposed between the rear barrier 300 and the backlight unit 100 to collect light emitted from the backlight unit 100 in the openings 403.

In this case, the display panel 200 is a non-emissive display panel for displaying an image on a screen using light emitted from the backlight unit 100 provided at a rear surface of the display panel, and typically includes a liquid crystal panel. In the present invention, a case in which the display panel 200 is a liquid crystal panel is described by way of example.

Meanwhile, the light source unit 100 shown in the drawings serves to emit light from a light source arranged at a lateral or bottom side of the display panel 200 upward, and includes a light source and a plurality of optical sheets (not shown).

The light source used in the light source unit 100 may include a fluorescent lamp array, a light emitting diode (LED) array, a laser light source array, etc., and also may include a plurality of optical sheets, such as light guide plates and diffusion sheets, to induce surface emission from a lower portion of the light source to the liquid crystal panel 200.

In addition, the rear barrier 300 has openings 403 regularly arranged therein, and the openings 403 serve to extend an optimal viewing distance (OVD) of the stereoscopic liquid crystal panel due to OVD properties, which are inversely proportional to an optical pitch of subpixels under the optically same gap conditions, by opening partial regions of each subpixel in the liquid crystal panel 200 to reduce the optical pitch of the liquid crystal panel 200 at a predetermined view. Here, the rear barrier 300 allows light corresponding to portions of images with different views transferred to the liquid crystal panel 200 to emit to the parallax unit 500 formed above the liquid crystal panel.

The related art stereoscopic image display device including the rear barrier 300 includes a gap glass having a thickness of approximately 5 mm or more, but the stereoscopic image display device has a light-shielding pattern patterned on a bottom surface of the liquid crystal panel 200. In this case, the patterned light-shielding pattern has a thickness of approximately 0.05 µm to 0.3 µm, a thickness of which hardly influences the sum of thicknesses of the liquid crystal panel 200 and the parallax unit 500. Therefore, the parallax unit and the rear barrier are provided in top and bottom surfaces of the liquid crystal panel, respectively, to maintain the stereoscopic image display device in a slim state, thereby realizing a stereoscopic image display device having an extended optimal viewing distance.

In addition, the parallax unit 500 is, for example, a lenticular lens array having lenses having a constant pitch PL regularly lengthily arranged in a horizontal direction. In addition, the lenticular lens array may be in a lens shape having a constant curvature as shown in the drawings, or may be a switchable lens array which is turned on/off by a voltage and in which a change in index of refraction is adjustable. When the parallax unit 500 is a switchable lens array, the stereoscopic image display device may selectively display a 3D/2D image by turning the switchable lens array on/off. In this case, the most basic configuration of the switchable lens array includes facing first and second substrates, a liquid crystal layer formed between the first and second substrates, a common electrode formed on the second substrate, and a plurality of first electrodes provided on the first substrate to corresponds to a lens region corresponding to one pitch.

When the stereoscopic image display device displays a 3D image, the switchable lens array is driven by applying the highest voltage to the first electrodes disposed in the center of the lens region, applying a decreasing voltage to the first electrodes as the first electrodes are located far away from the center of the lens region, and applying the lowest one of the voltages applied to the first electrodes to second electrodes. In this case, since the index of refraction is lowest in the center of the lens region and increases as the first electrodes are located far away from the center of the lens region, a difference in optical index of refraction may be obtained as in the lenticular lens, thereby separating images displayed on the liquid crystal panel 200 according to a point of view.

In addition, when the stereoscopic image display device displays a 2D image, the switchable lens array has no difference in index of refraction between the first electrodes and the common electrodes provided in the display device, and thus function as a transparent film to transfer images to a lower portion of the liquid crystal panel per se.

The liquid crystal panel 200 includes a lower plate 210 and an upper plate 220 facing each other, a liquid crystal layer filled between the lower plate 210 and the upper plate 220, a thin film transistor array formed at a side of the lower plate, and a color filter array formed at a side of the upper plate.

A first polarizing plate 110 and a second polarizing plate 120 may further provided at upper and lower sides of the liquid crystal panel 200. Such first and second polarizing plates 110 and 120 have transmission axes crossing each other, liquid crystals present at sides of the lower plate 210 and the upper plate 220 are initially aligned in a twisted state when no voltage is applied, thereby controlling transmission of light in an initial state.

The stereoscopic image display device adjusts an optimal viewing distance (OVD) by adjusting a period of the openings 403 as a distance between the starting point of adjacent openings 403, periods of which are repeated in subpixels on a horizontal line of the rear barrier 300, and pitches of unit lenses in the parallax unit 500.

In this case, when a difference between the period of the openings 403 and the pitches of the subpixels is set to increase by increasing or decreasing the period of the openings 403 and the pitches of the subpixels, a black-band effect in which a region having a wider area to overlap a black matrix layer appears more black on a display panel may be prevented.

Meanwhile, a lens pitch of the parallax unit 500 may be substantially identical to the period of the rear barrier 300. In some cases, the lens pitch of the parallax unit 500 may be slightly lower than the period of the rear barrier 300.

In this case, the optimal viewing distance decreases when the period of the respective openings of the rear barrier 300 is higher than the pitches of the subpixels, whereas the optimal viewing distance increases when the period of the respective openings of the rear barrier 300 is lower than the pitches of the subpixels.

Meanwhile, a light-shielding pattern is provided at a position at which the openings 403 are not formed on the rear barrier 300. In this case, an area ratio between the openings 403 and the light-shielding pattern 301 has a relationship of 1:(n−1) when the number of views is n.

A light collecting unit 400 is provided between the rear barrier 300 and the backlight unit 100.

The light collecting unit 400 serves to refract light emitted from the backlight unit 100 and collect the refracted light in the openings of the rear barrier 300.

For this purpose, the light collecting unit 400 is made of a transparent material with a certain pattern having a predetermined index of refraction.

Figure 2:
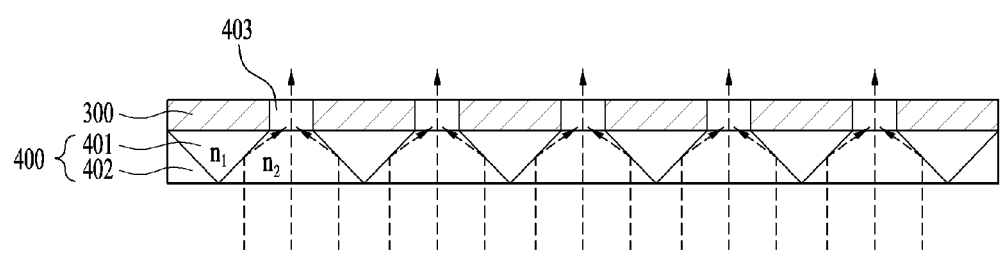
FIG. 2 illustrates a first embodiment of a light collecting unit provided in the stereoscopic image display device according to one exemplary embodiment of the present invention.

FIG. 2 illustrates a first embodiment of the light collecting unit 400 provided in the stereoscopic image display device according to one exemplary embodiment of the present invention.

The light collecting unit 400 according to the first embodiment includes a prism pattern 401 in an inverted triangular shape disposed below the rear barrier 300, and a transparent insulating film 402 disposed to cover a bottom surface of the rear barrier 300 including the prism pattern 401.

In this case, the prism pattern 401 may be formed of a transparent resin having a relatively low index of refraction (i.e., 1.4 to 1.5), and the transparent insulating film 402 may be formed of a transparent resin having a relatively high index of refraction (i.e., 1.6 to 1.7).

In this case, the prism pattern 401 and the transparent insulating film 402 may be formed using a UV curing agent (i.e., a UV resin), etc.

In addition, the prism pattern 401 is not disposed on the openings 403 of the rear barrier 300. That is, the prism pattern 401 in the inverted triangular shape is disposed between the respective openings 403, and the prism pattern 401 is disposed below each of the openings 403.

A light collection principle using the prism pattern 401 and the transparent insulating film 402 will be described below.

Light emitted from the backlight unit 100 to travel toward the openings 403 is incident on the liquid crystal panel 200 via the transparent insulating film 402 and the openings 403

Since the transparent insulating film 402 functions as a medium having a high index of refraction n2, and the prism pattern 401 functions as a medium having a low index of refraction n1, the light incident on the prism pattern 401 is totally reflected at a boundary between the transparent insulating film 402 and the prism pattern 401 according to the Snell's law. To cause such total reflection, an angle of a lower vertex of the prism pattern 401 may be in a range of 60° to 120°.

In this case, when an angle formed between the prism pattern 401 and the transparent insulating film 402 is greater than or equal to a critical angle, most of the light incident toward the prism pattern 401 is refracted toward the openings 403.

As a result, since the light emitted from the backlight unit 100 is directly incident on the openings 403 or is refracted to be incident on the openings 403, the stereoscopic image panel according to one exemplary embodiment of the present invention has an effect of highly improving brightness.

Figure 3:
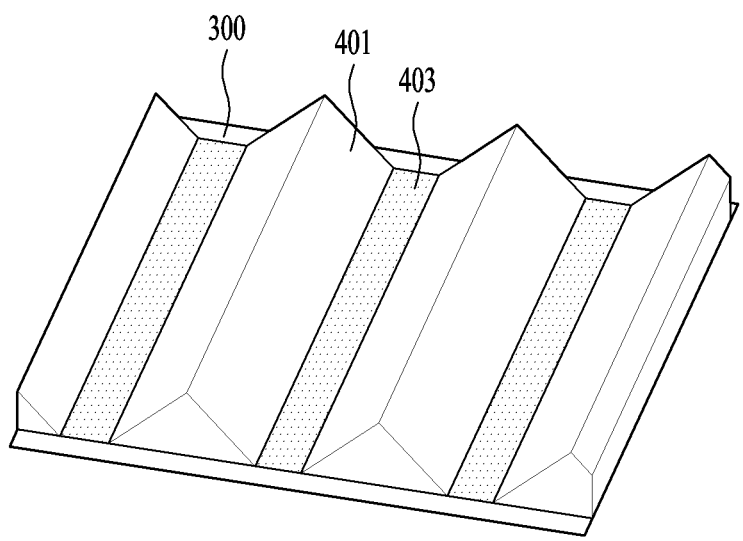
FIGS. 3 to 5 are views illustrating various shapes of a prism pattern provided in the light collecting unit according to the first embodiment.
Figure 4A:
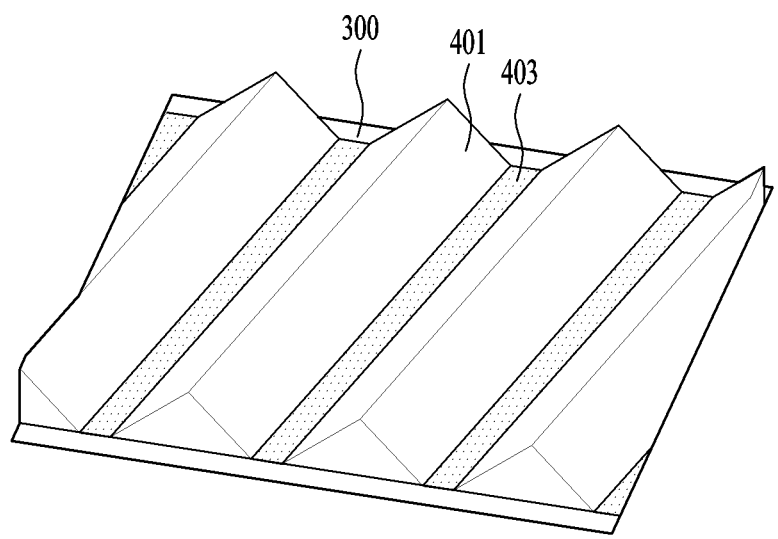
Figure 4B:
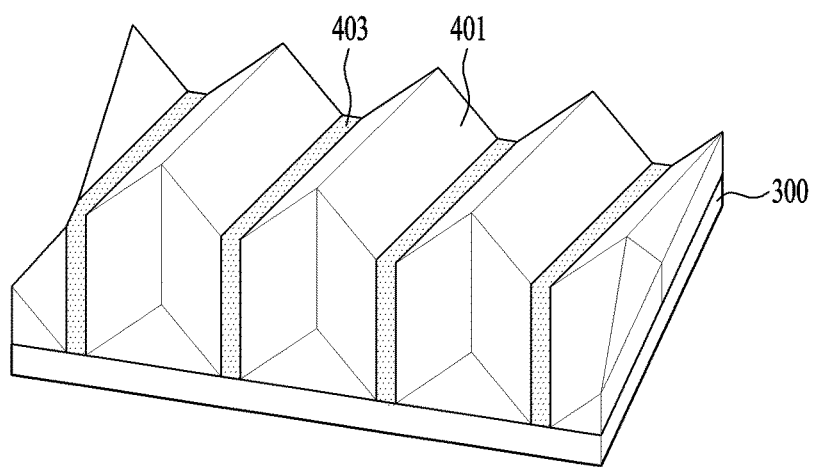
Figure 5:
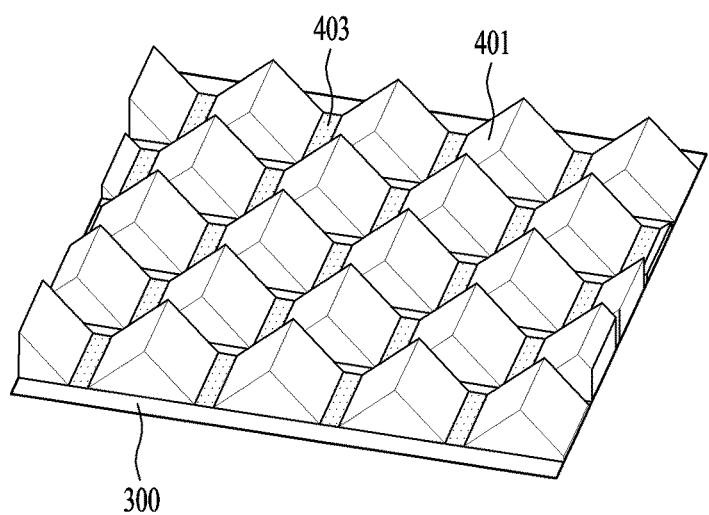

FIGS. 3 to 5 are views illustrating various shapes of the prism pattern 401 by way of example. Here, the transparent insulating film 402 is not shown for convenience of description.

FIG. 3 is a perspective view illustrating the shape of the prism pattern 401 when the openings 403 of the rear barrier 300 are formed in a rectangular shape.

As shown in FIG. 3, the openings 403 of the rear barrier 300 may be arranged with a constant period in a horizontal direction, and may be formed in a rectangular shape in which adjacent subpixels are exposed in a vertical direction.

In this case, the prism pattern 401 is formed in a trigonal prism shape in which one lateral surface in a rectangular shape comes in contact between the openings 403.

FIG. 4A is a perspective view illustrating the shape of the prism pattern 401 when the openings 403 of the rear barrier 300 are formed in a parallelogram shape, and FIG. 4B is a perspective view illustrating the shape of the prism pattern 401 when the openings 403 of the rear barrier 300 are formed in a modified parallelogram shape.

As shown in FIG. 4A, the openings 403 of the rear barrier 300 may be formed in a shape in which the openings 403 are inclined in an oblique direction, that is, a type of a parallelogram shape. In this case, the prism pattern 401 is formed in a trigonal prism shape in which one lateral surface in a rectangular shape comes in contact between the openings.

Referring the modified shape of FIG. 4A, the openings 403 of the rear barrier 300 may be formed so that the vertically adjacent parallelograms are formed in a shape inclined in opposite directions. In this case, the prism pattern may also be formed in a shape in which two trigonal prisms in which one lateral surface in a parallelogram shape comes in contact between the openings 403 are adjacent to each other in a vertical direction FIG. 5 is a perspective view illustrating the shape of the prism pattern 401 when the openings 403 of the rear barrier 300 are formed in a shape in which a plurality of small rectangles are arranged in an oblique direction.

As shown in FIG. 5, the rectangles of each of the openings 403 of the rear barrier 300 may be formed in a shape in which the rectangles are arranged in an oblique direction with respect to a vertical direction. In this case, the rear opening is shifted by an opening width with respect to the front opening. Such openings arranged in one oblique direction refer to a row of openings, and such a row of openings are arranged with a constant period in a horizontal direction.

In this case, a longitudinal length of each of the openings may be identical to a longitudinal length of each of the subpixels, and a horizontal length of each of the openings may be lower than a pitch of each of the subpixels. In this case, the prism pattern 401 is formed so that a plurality of short trigonal prisms have lateral surfaces coming in contact between the respective openings 403.

As described above, the prism pattern 401 may be modified in various shapes according to the pattern of the openings 403 provided in the rear barrier 300.

In addition, since the inclined angle is not more than 5° even when the openings 403 are formed in a parallelogram shape or the rows of openings 403 are formed in an oblique direction, brightness is not dramatically reduced regardless of the shapes of the openings 403 even when the lateral surfaces of the prism pattern 401 are formed in a trigonal prism shape.

Figure 6:
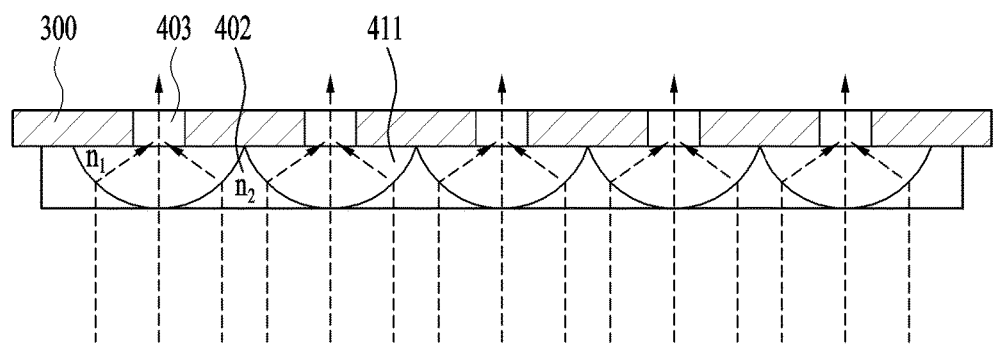
FIG. 6 illustrates a second embodiment of a light collecting unit provided in the stereoscopic image display device according to one exemplary embodiment of the present invention.

FIG. 6 illustrates a second embodiment of the light collecting unit 400 provided in the stereoscopic image display device according to one exemplary embodiment of the present invention.

The light collecting unit 400 according to the second embodiment of the present invention is characterized in that a plurality of lenticular lenses 411 are disposed on an entire lower surface of the rear barrier 300.

In this case, the lenticular lenses 411 are formed to cover the openings 403, respectively, and each of the openings 403 may be disposed in the center of each of the lenticular lenses 411.

When the lenticular lenses 411 are formed as described above, light emitted from the backlight unit 100 is refracted by the lenticular lenses 411 to be incident on the openings 403.

For this purpose, the lenticular lenses 411 are formed to have a low index of refraction (i.e., 1.4 to 1.5).

The transparent insulating film 402 has to be essentially formed in the light collecting unit 400 according to the first embodiment, but the transparent insulating film 402 may or may not be further formed on each of the lenticular lenses 411 in the light collecting unit 400 according to the second embodiment.

When the transparent insulating film 402 is formed on each of the lenticular lenses 411, the transparent insulating film may have a high index of refraction (i.e., 1.6 to 1.7). In this case, the lenticular lenses 411 or the transparent insulating film 402 may be formed using a UV curing agent (i.e., a UV resin), etc.

Such shapes of the lenticular lenses 411 may also be modified in various shapes according to the shapes of the openings 403.

Figure 7:
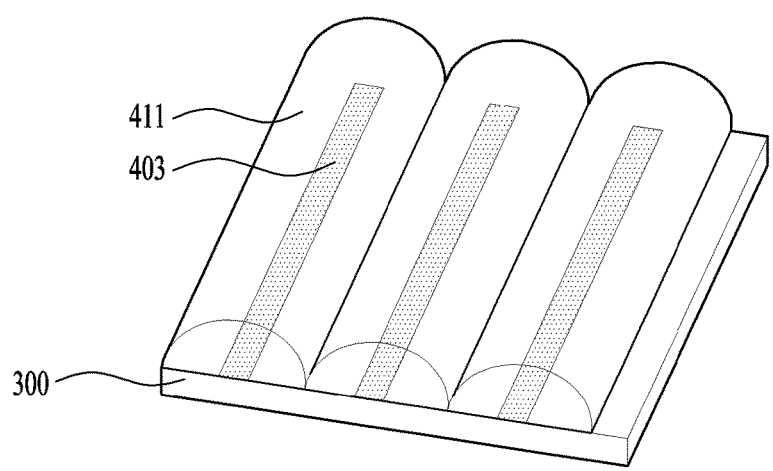
FIGS. 7, 8A, 8B, and 9 are views illustrating various shapes of a lenticular lens provided in the light collecting unit according to the second embodiment.
Figure 8A:
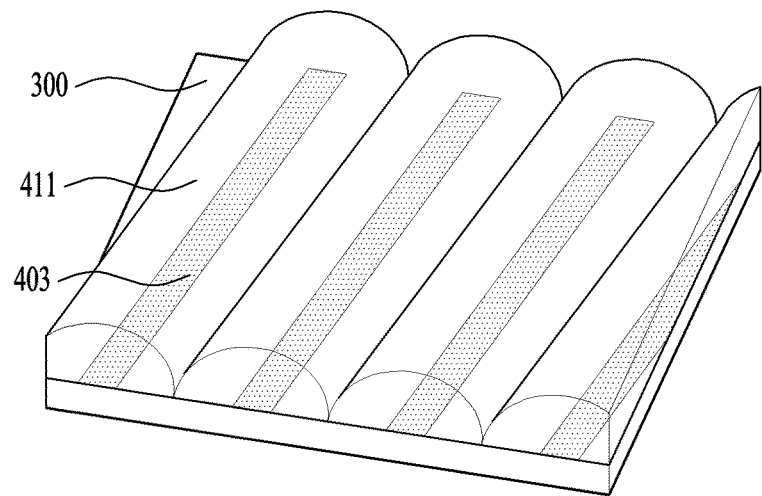
Figure 8B:
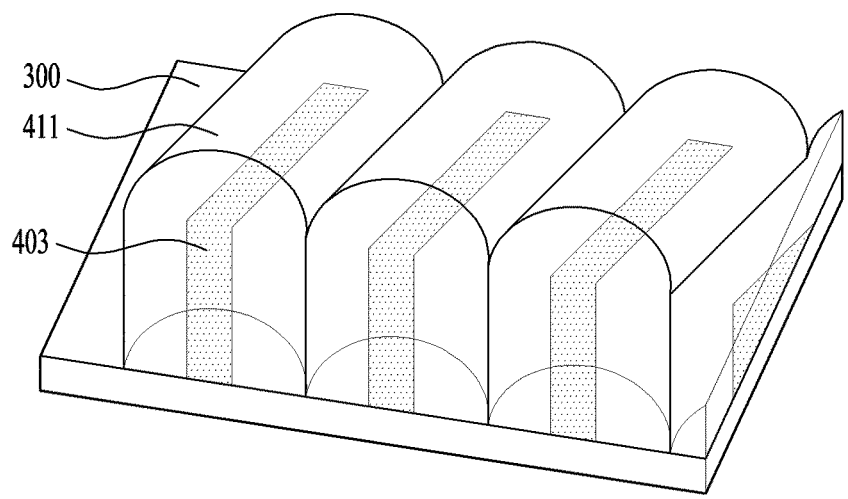
Figure 9:
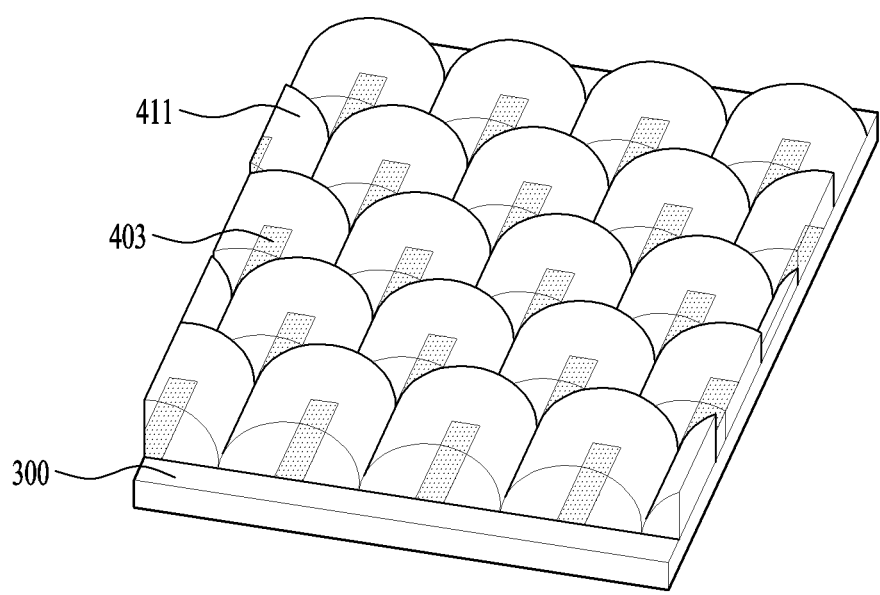

FIGS. 7 to 9 are views illustrating various shapes of the lenticular lens 411 by way of example. Here, the transparent insulating film 402 is not shown for convenience of description.

As shown in FIG. 7, the openings 403 of the rear barrier 300 may be formed in a plurality of rectangular shapes. In this case, the lenticular lenses 411 may be formed in a semi-cylindrical shape, and may also be formed so that the lateral surfaces in a rectangular shape cover the openings 403.

In addition, as shown in FIG. 8A, the openings 403 of the rear barrier 300 may be formed in a parallelogram shape. In this case, the lenticular lenses 411 may be formed in a semi-cylindrical shape in which a cylinder inclined at a predetermined angle is cut in a vertical direction, and parallelogram regions as the sections of the lenticular lenses 411 may be formed to cover the openings 403.

FIG. 8B is a view illustrating the opening 403 in a modified parallelogram shape, and the lenticular lens 411.

Referring to the modified shape of FIG. 8A, the openings 403 of the rear barrier 300 may be formed in a shape in which two adjacent parallelograms formed in a vertical direction are inclined in different directions, as shown in FIG. 8B. In this case, the lenticular lenses 411 may have a shape in which two inclined semi-cylinders having parallelogram sections inclined at different angles are adjacent to each other in a vertical direction.

In addition, as shown in FIG. 9, a plurality of rectangles of each of the openings 403 of the rear barrier 300 may be formed in a shape in which the rectangles are arranged in an oblique direction with respect to a vertical direction. In this case, the rear opening is shifted by an opening width with respect to the front opening. Such openings arranged in one oblique shape refer to a row of openings, and such a row of openings are arranged with a constant period in a horizontal direction.

In this case, the rectangular sections of the lenticular lenses 411 having a shape in which a cylinder is cut in a vertical direction may be arranged in an oblique direction to cover the respective openings 403.

Meanwhile, in this case, lenticular lenses having a long semi-cylindrical shape in which the base side as shown in FIG. 8A is in a parallelogram shape are applicable. Since the slope of a row of openings in a vertical direction is not more than approximately 5°, lenticular lenses having a long semi-cylindrical shape in which the base side as shown in FIG. 7 is in a rectangular shape are applicable as well.

As described above, the lenticular lenses 411 may be modified in various shapes according to the pattern of the openings 403 provided in the rear barrier 300.

In addition, since the angle of the openings 403 inclined in a vertical direction is not more than 5° even when the openings 403 are formed in a parallelogram shape or the rows of openings 403 are formed in an oblique direction, brightness is not dramatically reduced regardless of the shapes of the openings 403 even when the lenticular lenses 411 are formed as shown in FIG. 7.

Figure 10A:
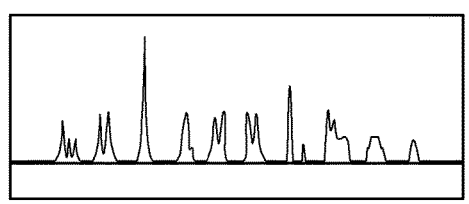
FIG. 10A is a graph illustrating results obtained by detecting a change in brightness using the light collecting unit according to the first embodiment.
Figure 10A:
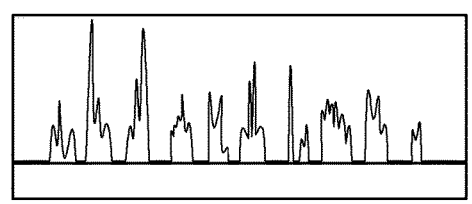
Figure 10B:
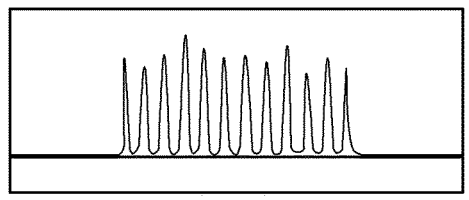
FIG. 10B is a graph illustrating results obtained by detecting a change in brightness using the light collecting unit according to the second embodiment.
Figure 10B:
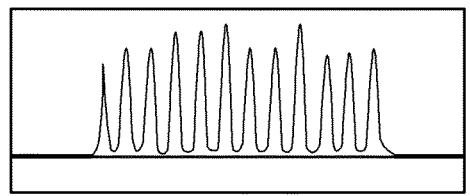

FIG. 10A is a graph illustrating results obtained by detecting a change in brightness using the light collecting unit 400 according to the first embodiment, and FIG. 10B is a graph illustrating results obtained by detecting a change in brightness using the light collecting unit according to the second embodiment.

In FIGS. 10A and 10B, the left graph represents the brightness of the stereoscopic image display device including no light collecting unit 400, and the right graph represents the brightness of the stereoscopic image display device including the light collecting unit 400.

An x-axis direction represents a position of a subpixel, and a y-axis direction represents brightness. Since light is not transmitted through a subpixel region other than the openings 403 due to the presence of the rear barrier 300, the pitches in the graph are not continuous.

Therefore, it can be seen that, when the prism pattern 401 according to the first embodiment is used, and when the lenticular lens 411 according to the second embodiment is used, brightness detected for each of the openings is highly improved, compared to when the prism pattern 401 and the lenticular lens 411 are not used.

As described above, the present invention is characterized in that problems, such as degraded brightness that is one drawback of the stereoscopic image display device in which stereoscopic images are realized using the rear barrier and the parallax unit, are solved using the light collecting unit including the prism pattern or the lenticular lenses.

The present invention provides a stereoscopic image display device in which stereoscopic images are realized using the rear barrier and the parallax unit without using a gap glass. Accordingly, the stereoscopic image display device further includes the light collecting unit, and thus the brightness of the stereoscopic image display device can be highly improved by collecting light emitted from the backlight unit in the openings of the rear barrier.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device, comprising:
a display panel for displaying an image, the display panel having a plurality of subpixels in a matrix form;
a rear barrier disposed on a bottom surface of the display panel and comprising openings to open partial region of respective subpixels in a horizontal line of the respective subpixels and have a predetermined pattern at different positions having certain period;
a parallax unit disposed on the display panel;
a backlight unit disposed below the display panel and the rear barrier; and
a light collecting unit disposed between the backlight unit and the rear barrier.

2. The stereoscopic image display device according to claim 1, wherein the light collecting unit comprises:
a prism pattern having a plurality of prisms arranged below the rear barrier; and
a transparent insulating film for covering the prism pattern.

3. The stereoscopic image display device according to claim 2, wherein the prism pattern comprises a plurality of trigonal prisms having a trigonal prism shape in which one lateral surface comes in contact between the openings in a horizontal direction of the rear barrier, and the openings are exposed.

4. The stereoscopic image display device according to claim 3, wherein the trigonal prisms has a trigonal prism shape in which each of the trigonal prisms has a rectangular lateral surface whose main axis is disposed in a vertical direction.

5. The stereoscopic image display device according to claim 3, wherein each of the trigonal prisms has a parallelogram shape in which adjacent surfaces of the trigonal prisms between the openings are inclined in a vertical direction.

6. The stereoscopic image display device according to claim 3, wherein each of the trigonal prisms has a shape in which two parallelograms whose adjacent surfaces are inclined in different directions come in contact between the openings.

7. The stereoscopic image display device according to claim 3, wherein each of the openings has a plurality of rectangles having the same longitudinal length as the subpixels arranged obliquely with respect to a vertical direction, and a plurality of rows of openings in which a rear opening is shifted by an opening width with respect to a front opening are arranged with a constant period in a horizontal direction, and
each of trigonal prisms is disposed between the openings adjacent in a horizontal direction.

8. The stereoscopic image display device according to claim 3, wherein a lower vertex of each of the trigonal prisms has an angle of 60° to 120°.

9. The stereoscopic image display device according to claim 2, wherein the prism pattern has an index of refraction of 1.4 to 1.5, and
the transparent insulating film has an index of refraction of 1.6 to 1.7.

10. The stereoscopic image display device according to claim 1, wherein the light collecting unit comprises a plurality of lenticular lenses arranged below the rear barrier.

11. The stereoscopic image display device according to claim 10, wherein the lenticular lens covers a bottom surface of the opening, and a central region of the lenticular lens is disposed to correspond to the opening.

12. The stereoscopic image display device according to claim 11, wherein the opening has a rectangular shape in which adjacent subpixels are exposed in a vertical direction, and
the lenticular lens has a semi-cylindrical shape, and a rectangular section of the lenticular lens covers the opening.

13. The stereoscopic image display device according to claim 11, wherein the lenticular lens has a parallelogram section in a semi-cylindrical shape, and the parallelogram section covers the opening.

14. The stereoscopic image display device according to claim 11, wherein the lenticular lens has a shape in which two semi-cylinders with parallelogram sections inclined in different directions with respect to a vertical direction are adjacent in a vertical direction, and the section covers the opening.

15. The stereoscopic image display device according to claim 11, wherein each of the openings has a plurality of rectangles having the same longitudinal length as the subpixels arranged obliquely with respect to a vertical direction, and a plurality of rows of openings in which the rear opening is shifted by an opening width with respect to the front opening are arranged with a constant period in a horizontal direction, and the lenticular lenses are disposed respectively to correspond to the openings, and thus to cover the openings.

16. The stereoscopic image display device according to claim 10, wherein the lenticular lens has an index of refraction of 1.4 to 1.5.

17. The stereoscopic image display device according to claim 10, wherein the light collecting unit further comprises a transparent insulating film disposed below the lenticular lens to cover the lenticular lens.

18. The stereoscopic image display device according to claim 17, wherein the transparent insulating film has an index of refraction of 1.6 to 1.7.

* * * * *